US012762474B2

(12) United States Patent
Butt et al.

(10) Patent No.: US 12,762,474 B2
(45) Date of Patent: Oct. 13, 2026

(54) SAMPLING USER EQUIPMENT FOR FEDERATED LEARNING MODEL COLLECTION

(71) Applicant: NOKIA TECHNOLOGIES OY, Espoo (FI)

(72) Inventors: Muhammad Majid Butt, Palaiseau (FR); Stephen Mwanje, Dorfen (DE); Fahad Syed Muhammad, Orsay (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 764 days.

(21) Appl. No.: 18/031,383

(22) PCT Filed: Oct. 29, 2020

(86) PCT No.: PCT/EP2020/080435

§ 371 (c)(1),
(2) Date: Apr. 12, 2023

(87) PCT Pub. No.: WO2022/089751

PCT Pub. Date: May 5, 2022

(65) Prior Publication Data

US 2023/0409962 A1 Dec. 21, 2023

(51) Int. Cl.
*G06N 20/00* (2019.01)
*H04L 41/16* (2022.01)

(52) U.S. Cl.
CPC .............. *G06N 20/00* (2019.01); *H04L 41/16* (2013.01)

(58) Field of Classification Search
CPC ................................ G06N 20/00; H04L 41/16
See application file for complete search history.

(56) References Cited

U.S. PATENT DOCUMENTS

2021/0158099 A1* 5/2021 Tuor ........................ G06F 18/24
2021/0203565 A1* 7/2021 Arora ........................ G06N 5/04
2022/0044162 A1* 2/2022 Zhang .................... G06N 20/20

FOREIGN PATENT DOCUMENTS

CN 111447083 A 7/2020

OTHER PUBLICATIONS

Nishio, Takayuki, and Ryo Yonetani. "Client selection for federated learning with heterogeneous resources in mobile edge." ICC 2019-2019 IEEE international conference on communications (ICC). IEEE, 2019 (Year: 2018).*

(Continued)

*Primary Examiner* — Andrew T McIntosh
(74) *Attorney, Agent, or Firm* — Carter, DeLuca & Farrell LLP

(57) ABSTRACT

First user equipments are detected out of a plurality of user equipments of a cellular communication system (S201). The user equipments respectively correspond to a distributed node of a federated machine-learning concept and respectively generate a partial machine-learning model, wherein partial machine-learning models generated by the plurality of user equipments are to be used to update a global machine-learning model at the network side of the cellular communication system. The first user equipments are user equipments comprising ready partial machine-learning models. Out of the first user equipments, second user equipments are selected at least based on a time information associated with the first user equipments (S203), the ready partial machine-learning models respectively generated by the second user equipments are acquired (S205), the global machine-learning model is updated using the ready partial machine-learning models acquired (S207), and convergence of the global machine-learning model updated by the ready partial machine-learning models acquired is determined (S209). In case convergence of the S207 global machine- (Continued)

learning model is not determined, a process comprising the detecting (S201), selecting (S203), acquiring (S205), updating (S207) and determining (S209) is repeated.

10 Claims, 7 Drawing Sheets

(56) References Cited

OTHER PUBLICATIONS

Cho, Yae Jee, Jianyu Wang, and Gauri Joshi. "Client selection in federated learning: Convergence analysis and power-of-choice selection strategies." arXiv preprint arXiv:2010.01243 (2020) (Year: 2020).*
Huang, Tiansheng, et al. "An efficiency-boosting client selection scheme for federated learning with fairness guarantee." IEEE Transactions on Parallel and Distributed Systems 32.7 (2020): 1552-1564 (Year: 2020).*
Khan, Latif U., et al. "Federated learning for edge networks: Resource optimization and incentive mechanism." IEEE Communications Magazine 58.10 (2020): 88-93 (Year: 2020).*
International Search Report and Written Opinion dated Jul. 27, 2021 corresponding to International Patent Application No. PCT/EP2020/080435.
Mingzhe Chen et al., "Convergence Time Optimization for Federated Learning over Wireless Networks," arxiv.org, Jan. 22, 2020, XP081583466.
Li Li et al., "SmartPC: Hierarchical Pace Control in Real-Time Federated Learning System," 2019 IEEE Real-Time Systems Symposium (RTSS), IEEE, Dec. 3, 2019, pp. 406-418, XP033753005.

* cited by examiner

SAMPLING USER EQUIPMENT FOR FEDERATED LEARNING MODEL COLLECTION

TECHNICAL FIELD

At least some example embodiments relate to apparatuses, methods and non-transitory computer-readable storage media for sampling user equipments (UEs) for federated learning (FL) model collection, preferably in wireless networks.

BACKGROUND

Many applications in mobile networks require a large amount of data from multiple distributed units like UEs to be used to train a single common model. To minimize the data exchange between the distributed units where the data is generated and the centralized units where the common model is to be created, the concept of Federated learning (FL) may be applied.

Federated learning (FL) is a form of machine learning where instead of model training at a single node, different versions of the model are trained at different distributed nodes. This is different from distributed machine learning, where a single ML model is trained at distributed nodes to use computation power of different nodes. In other words, Federated learning is different from distributed learning in the sense that: 1) each distributed node in a federated learning scenario has its own local data which may not come from the same distribution as the data at other nodes; 2) the distributed node computes parameters for its local ML model and 3) a central host does not compute a version or part of the model but combines parameters of all the distributed models to generate a global model. The objective of this approach is to keep the training dataset where it is generated and perform the model training locally at each individual learner (distributed unit) in the federation.

After training a local model, each individual learner transfers its local model parameters, instead of raw training dataset, to an aggregating unit (central host). The aggregating unit utilizes the local model parameters to update the global model which is eventually fed back to the individual local learners for their use. As a result, each local learner benefits from the datasets of the other learners only through the global model, shared by the aggregating unit, without explicitly accessing high volume of privacy-sensitive data.

LIST OF ABBREVIATIONS

5G Fifth Generation
CN Core Network
CQI Channel Quality Indicator
DTH Distributed Training Host
FL Federated Learning
gNB 5G NodeB
HoL Head of Line
ML Machine Learning
MTH Meta Training Host
QoS Quality of Service
RB Resource Block
RRM Radio Resource Management
RSRP Reference Signal Received Power
UE User equipment

SUMMARY

At least some example embodiments aim at providing efficient model collection from distributed nodes in a cellular communication system according to a federated learning concept, under constraints such as data transmission requirements and load imposed on an access network of the cellular communication system.

According to at least some example embodiments, this is achieved by apparatuses, methods and non-transitory computer-readable storage media as specified by the appended claims.

According to at least some example embodiments an FL model collection method is provided that intelligently samples UEs for model collection, helping to improve performance of the aggregated model for a fixed amount of resource blocks available for model transmission in a particular model collection round.

In the following example embodiments will be described with reference to the accompanying drawings.

DESCRIPTION OF THE EMBODIMENTS

Figure 1:
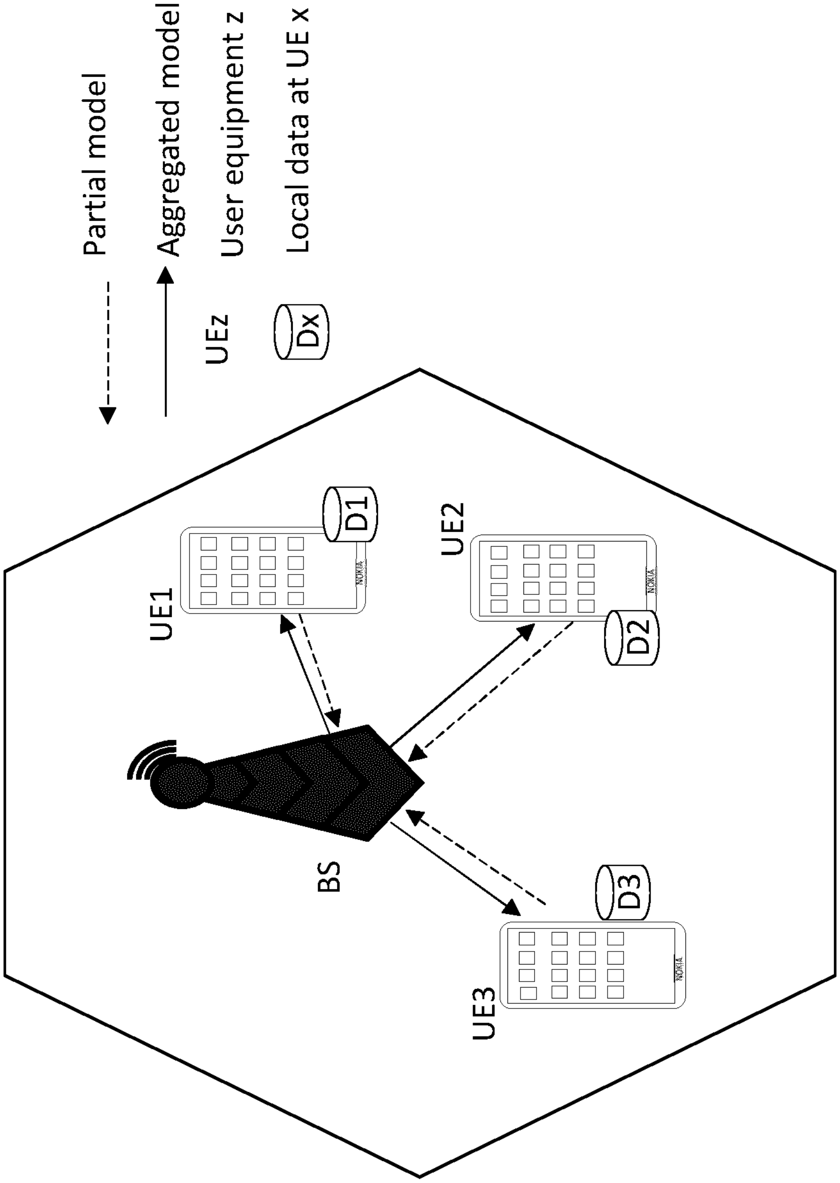
FIG. 1 shows a schematic diagram illustrating a federated learning model in which at least some example embodiments are implementable.

As illustrated in FIG. 1, according to the federated learning (FL) concept, in a wireless network (e.g. wireless access network) of a cellular communication system, UEs (UE1, UE2, UE3) acting as distributed nodes (distributed training hosts, DTHs) transmit their local FL models (also referred to as local models, local user FL models, partial models or partial machine-learning models) trained using their locally collected data D1, D2, D3 to a base station BS (e.g. gNB). The BS, acting as a central controller (central host, Meta Training Host, MTH), generates a global FL model (also referred to as aggregated model) using the received local FL models and broadcasts it back to all UEs. It is noted that partial and aggregated models both are transmitted on regular communication links.

The collection of the local models has three major peculiarities that complicate the process:

1—Each UE has unique training data samples, so the BS prefers to include as many of the local user FL models as possible to generate a converged global FL model. However, all the distributed local models do not mature at the same time (e.g. they are not equally sufficiently updated at the same frequency). Correspondingly, a method is needed that allows models to be collected from all UEs but in a way that does not compromise the convergence speed of the global model.

2—The maturity of the local model does not necessarily translate into convergence of the global model, i.e. there are multiple maturity conditions that can be utilized to decide when to collect the local models and use of local models that have fulfilled the maturity condition does not necessarily imply that the global model will converge. Correspondingly, a method is needed to ensure that the global model can be updated to converge regardless of the kind of maturity condition used to collect the local models.

3—The transmission of the model is resource intensive on the UE's transmission resources and there is a limited number of resource blocks (RBs) in a network. Therefore, the considerations such as optimum number of local learners to participate in the global update, grouping of the local learners, and frequency of local updates and global aggregation, that could help in managing the model transfer by inducing trade-off between model performance and resource preservation, are application dependent.

On the other side, UEs may have other data (e.g. for ongoing service transactions) which they would like to transmit without much disruptions to their own QoS. The convergence time for federated learning includes not only the computation time on the local learners and the aggregator but also the communication time between them which depends on the wireless channel quality as well as data transmission requirements of the UEs which delay model transmission.

Hence, the FL performance and convergence time will be significantly affected by model collection scheduling. Ideally, the aggregating unit would like to collect models from all the distributed hosts, but it is too difficult in wireless networks where local ML models are hosted by the UEs and the aggregating unit is at a base station (e.g. gNB) or a network side entity. To reduce communication load in collecting updated models from all distributed hosts/UEs, it is important to sample UEs and design a model collection scheme that optionally selects a subset of UEs with matured models in each round by accounting for their model transmission history as well as channel conditions. This is called asynchronous model collection.

According to at least some example embodiments, a solution is proposed that allows the gNb to optimize the selection of UEs from which to receive local distributed models in such a way that minimizes the amount of resources (RBs) required to collect models allowing fast convergence of the aggregated model. Due to scarcity of resources, mainly available resource blocks (RBs), and data requirements of the UEs, not all UEs can be scheduled simultaneously to transmit their locally trained ML models in each round and therefore, a sample of the UEs needs to be selected as the ones to provide their updated/matured models to the main host.

Figure 2:
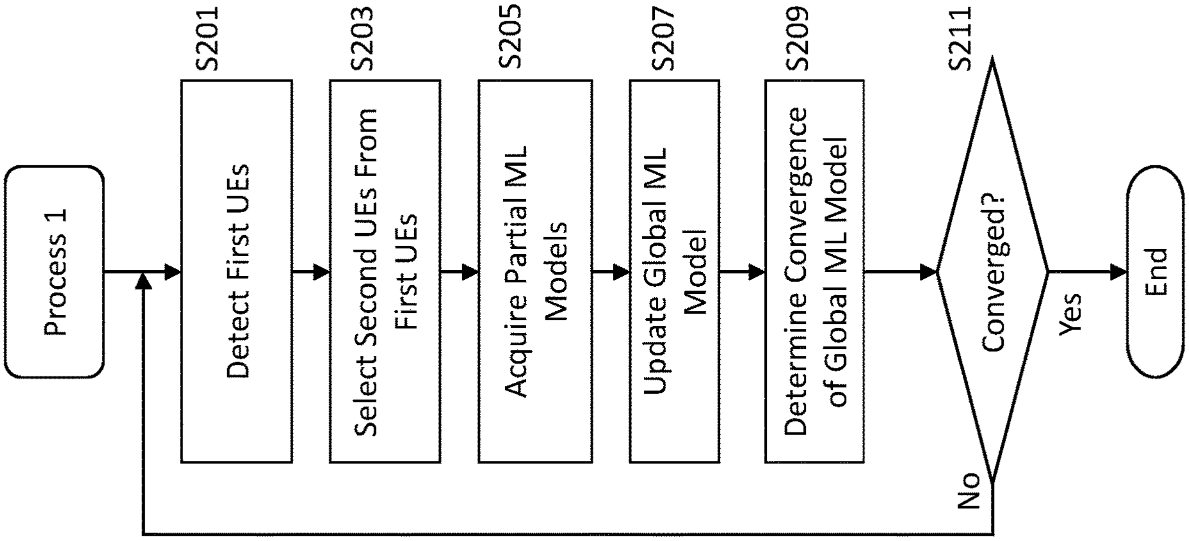
FIG. 2 shows a flowchart illustrating a process according to at least some example embodiments.

FIG. 2 shows a flowchart illustrating a process 1 according to at least some example embodiments, which is executed at network side of a cellular communication system, e.g. at access network side, e.g. at a base station (e.g. gNB). According to an example implementation, process 1 is executed by ML-application layer. According to another example implementation, process 1 is executed by an ML host in the gNB, an ML host in CU in case of split architecture of gNB, or an ML host in CN.

According to an example implementation, process 1 is implemented by an apparatus for use at a network side of a cellular communication system, the apparatus comprising at least one processor and at least one memory including computer program code, the at least one memory and the computer program code configured to, with the at least one processor, cause the apparatus at least to perform process 1.

In step S201, first user equipments are detected out of a plurality of user equipments of the cellular communication system. The user equipments respectively correspond to a distributed node of a federated machine-learning concept and respectively generate a partial machine-learning model. The partial machine-learning models generated by the plurality of user equipments are to be used to update a global machine-learning model at the network side of the cellular communication system. The first user equipments are user equipments comprising ready partial machine-learning models.

According to at least some example embodiments, the ready partial machine-learning models comprise at least one of:

- partial machine-learning models that have matured;
- partial machine-learning models that have matured for a predetermined first time period;
- partial machine-learning models that have been updated;
- partial machine-learning models that have been updated since a predetermined second time period.

For example, the predetermined first and second time periods are set to prevent collecting outdated matured or updated partial ML models.

For example, maturity of a partial ML model is determined by using any known method, e.g., percentage change in model parameters as compared to the model already transmitted.

According to at least some example embodiments, for detecting the first user equipments step S201 comprises requesting the plurality of user equipments of the cellular communication system to indicate a status of the partial machine-learning models, wherein the status indicates whether or not the partial machine-learning models are ready. Alternatively or in addition, step S201 comprises requesting the plurality of user equipments of the cellular communication system which comprise a ready partial machine-learning model to indicate time information which will be described in more detail later on.

In step S203, out of the first user equipments, second user equipments are selected at least based on the time information associated with the first user equipments.

According to at least some example embodiments, the time information comprises a waiting time duration for which a user equipment of the first user equipments has been waiting for transmitting its ready partial machine-learning model.

According to at least some example embodiments, step S203 comprises selecting the second user equipments out of the first user equipments also based on channel conditions associated with the first user equipments.

According to at least some example embodiments, step S203 comprises selecting the second user equipments also based on a quota of uplink resources available for acquiring ready partial machine-learning models.

According to at least some example embodiments, step S203 comprises prioritizing the first user equipments based on their time information.

According to at least some example embodiments, step S203 comprises selecting the second user equipments out of the first user equipments which have been prioritized based on their time information, based on the quota of uplink resources available for acquiring ready partial machine-learning models.

According to at least some example embodiments, step S203 comprises prioritizing the first user equipments prioritized based on their time information also based on channel conditions associated with the first user equipments. For example, for being selected as second user equipments, the first user equipments are prioritized which have been prioritized based on their time information and are associated with channel conditions meeting a predetermined threshold, which will be described in more detail later on.

According to at least some example embodiments, step S203 comprises selecting the second user equipments out of the first user equipments which have been prioritized based on their time information and channel conditions, based on the quota of uplink resources available for acquiring ready partial machine-learning models, which will be described in more detail later on.

According to at least some example embodiments, step S203 comprises selecting a user equipment of the plurality of user equipments as second user equipment also based on a number of times of repeating the process in which the user equipment has been detected as first user equipment and has been prioritized based on the time information and has not been selected as second user equipment, which will be described in more detail later on.

In step S205, the ready partial machine-learning models respectively generated by the second user equipments are acquired.

According to at least some example embodiments, step S205 comprises requesting the second user equipments to transmit the ready partial machine-learning model by using uplink resources available for acquiring the ready partial machine-learning models.

According to at least some example embodiments, step S205 further comprises transmitting updated time information to first user equipments not selected as second user equipments. According to at least some example embodiments, each UE has a timer that counts how long the UE has taken without sending a model, i.e. how long the UE is waiting to send a ready partial machine-learning model. Whenever the UE is selected to send its model, it then has to restart the timer.

In step S207, the global machine-learning model is updated using the ready partial machine-learning models acquired in step S205.

In step S209, convergence of the global machine-learning model updated in step S207 is determined. Then, process 1 advances to step S211.

In case convergence of the global machine-learning model is not determined (No in step S211), process 1 is returned to step S201 and steps S201 to S211 are repeated e.g. after waiting for the next model collection 30 round. Otherwise, in case convergence of the global machine-learning model is determined (Yes in step S211), process 1 ends.

Figure 3:
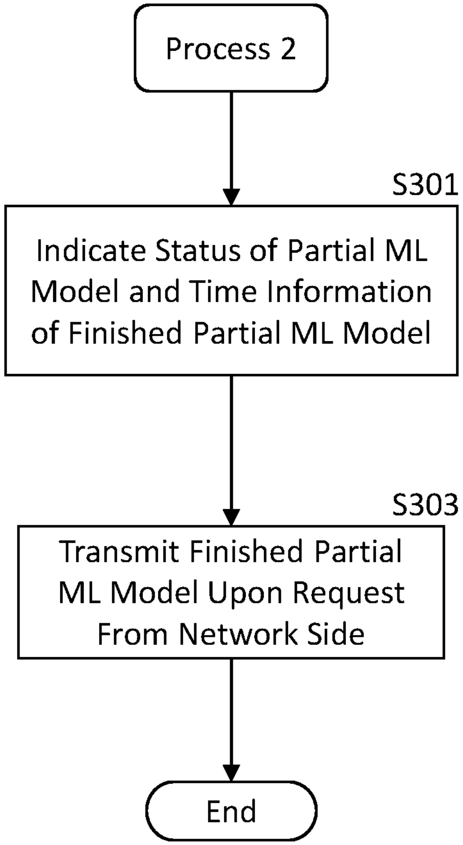
FIG. 3 shows a flowchart illustrating a process for FL model selection according to at least some example embodiments.

FIG. 3 shows a flowchart illustrating a process 2 according to at least some example embodiments, which is executed at UE side of the cellular communication system. According to an example implementation, process 2 is implemented by a user equipment of a plurality of user equipments for use in a cellular communication system, the user equipment comprising at least one processor and at least one memory including computer program code, the at least one memory and the computer program code configured to, with the at least one processor, cause the user equipment at least to perform process 2.

In step S301, a status whether or not the user equipment, as a distributed node of the federated machine-learning concept, has finished generating or updating a partial machine-learning model, i.e. whether or not the user equipment has a ready partial machine learning model, and time information associated with the ready partial machine-learning model are indicated.

According to at least some example embodiments, the status and time information are indicated in response to a corresponding request from the network side (e.g. as performed in step S201 of FIG. 2).

In step S303, upon a corresponding request from the network side (e.g. as performed in step S205 of FIG. 2), the ready partial machine-learning model is transmitted using uplink resources available for acquiring ready partial machine-learning models.

According to at least some example embodiments, in step S303, after transmitting the ready partial machine-learning model the time information is reset. Alternatively, according to at least some example embodiments, the time information is updated upon receiving corresponding signaling from the network side.

According to at least some example embodiments, available surplus RBs are used to intelligently sample model collection from the UEs whose model has long waited for transmission and whose channel conditions are relatively good to maximize the use of available resources.

According to at least some example embodiments, signaling information is provided to implement processes 1 and 2 in the cellular communication system when UEs act as distributed training host (DTH) and gNB acts as meta training host (MTH).

According to at least some example embodiments, convergence of the global model (also referred to as global ML model) regardless of an applied maturity condition is ensured by collecting the local models (also referred to as partial ML models) in multiple rounds in process 1, e.g. ready partial ML models collected from UEs in each round of process 1 are applied to update the global model and process 1 is repeated until the global model converges.

According to at least some example embodiments, faster convergence of the global model is enabled even where local models are differentially updated (owing to differences in amount and frequency of local data) by collecting the local models through an iterative method as illustrated in FIG. 2, in which the gNB selects a subset of the UEs to deliver their local models at a given time within a single round.

According to at least some example embodiments, diversity of data used for model update is maximized by prioritizing those UEs which have not sent their local model in a long time, e.g. those which have waited long without sending a local model.

According to at least some example embodiments, uplink resource utilization is maximized for both the gNB and UE side by prioritizing the UEs with better resource utilization, e.g. the UEs with better channel conditions.

At least some example embodiments sample/select the UEs for model collection that result into minimum impact on UE data transmission and use minimum RBs to transmit as many local models as possible.

In the following, further details of processes 1 and 2 shown in FIGS. 2 and 3 will be described with reference to FIGS. 4 to 6.

Figure 4:
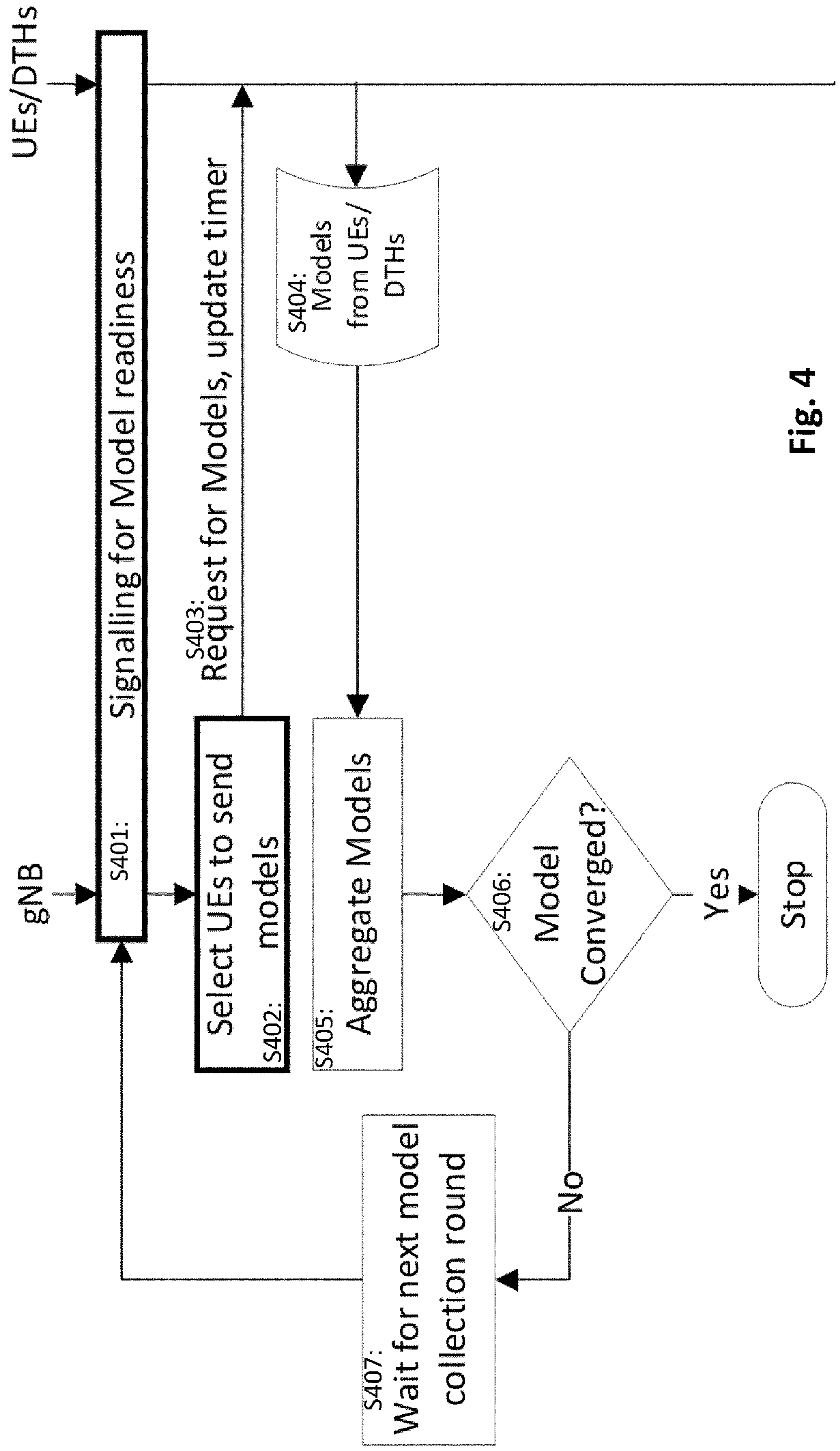
FIG. 4 shows a flow diagram illustrating an end-to-end method for FL model selection according to at least some example embodiments.

FIG. 4 shows a flow diagram illustrating a network level end to end method according to at least some example embodiments. Convergence is evaluated in each model collection round regardless of size/number of the UEs (second UEs in the description of FIG. 2) sending their updated (ready) local models.

A gNB takes multiple model update rounds (also referred to as model collection rounds or model selection rounds) in which it selects UEs to transmit their local models, updates the global model and continues the loop until the global model converges. The respective steps are as follows and are illustrated in FIG. 4:

In each model update round, the gNB sends a request to UEs (plurality of UEs in the description of FIG. 2) for information on updated models, and UEs with updated (ready) models (first UEs in the description of FIG. 2) respond to indicate readiness to send the updated models (S401). According to an example implementation, the response also includes time information (e.g. a timer) of how long the UEs have been waiting.

Further, in each model round, the gNB selects applicable UEs (S402). Details of step S402 will be described with reference to FIG. 6.

Further, in each model round, the gNB requests and receives ready local models from the selected UEs (S403, S404).

Further, in each model round, the gNB updates the global model (S405), and tests convergence of the global model (S406). If not converged (no in S406), the process of FIG. 4 continues to S407 in which it waits for the next model collection round.

Figure 5:
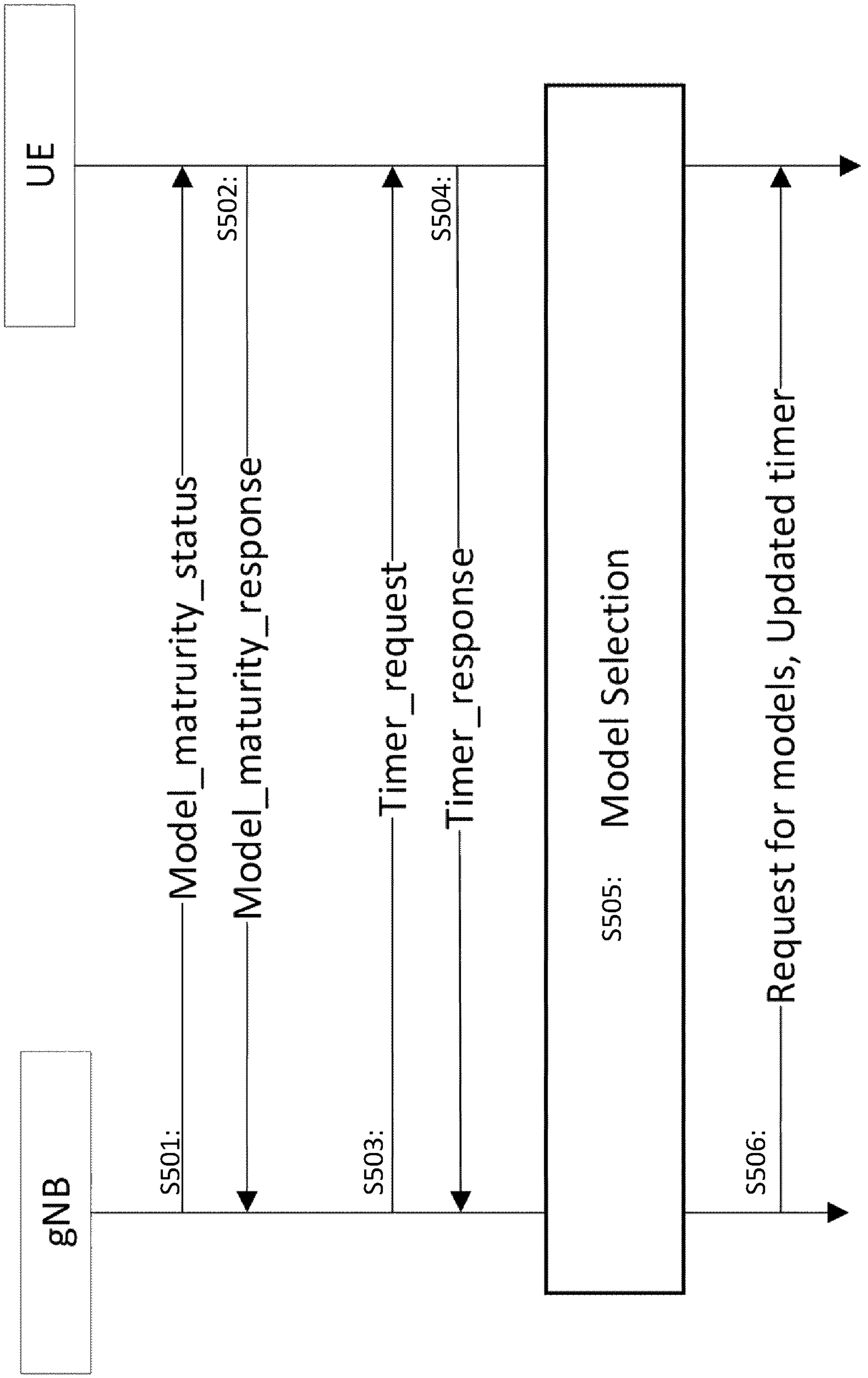
FIG. 5 shows a signaling diagram illustrating signaling for FL model selection according to at least some example embodiments.
Figure 6:
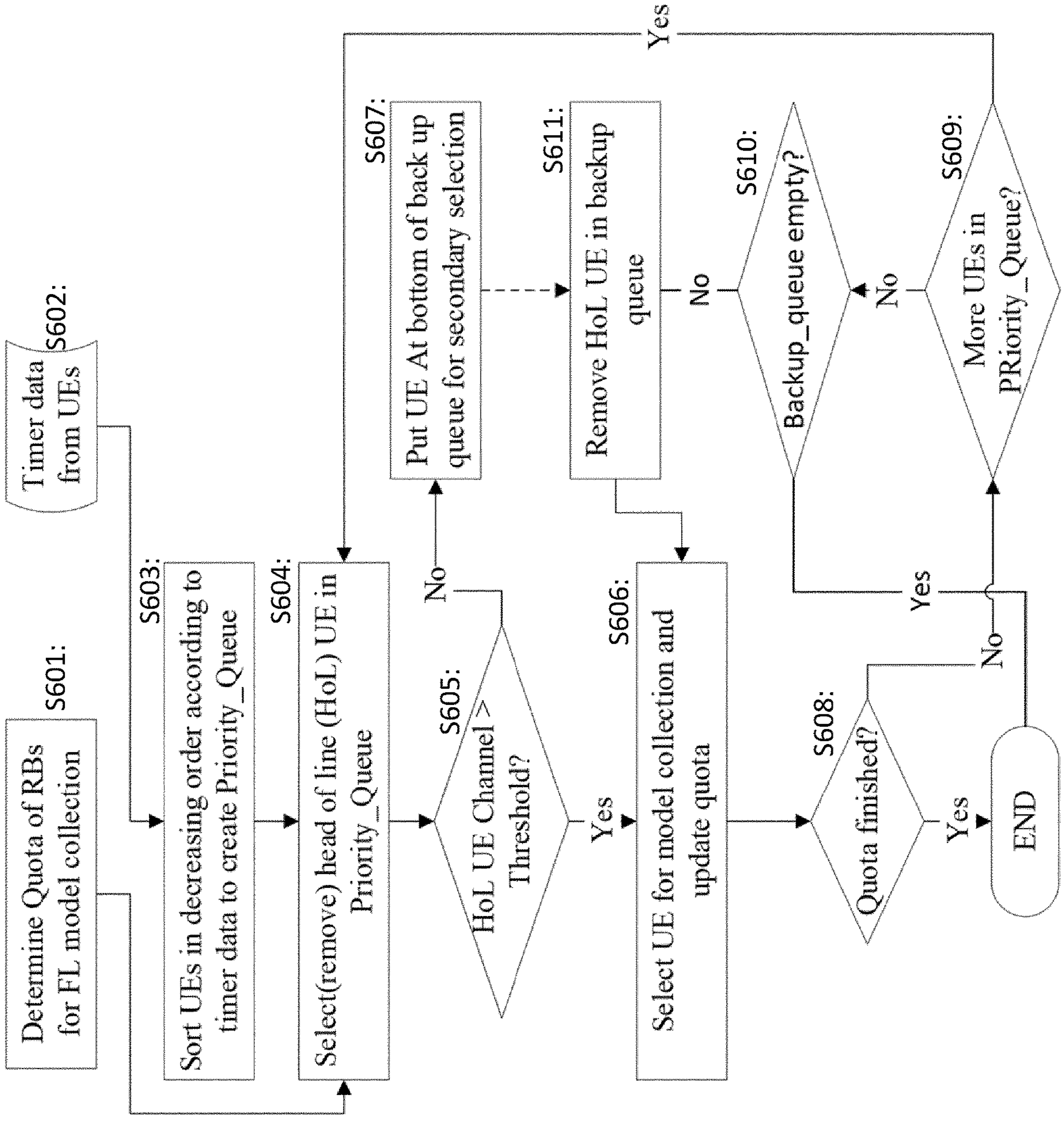
FIG. 6 shows a flowchart illustrating a process for FL model selection according to at least some example embodiments.

FIG. 5 shows a signaling diagram for the end-to-end method shown in FIG. 4 according to at least some example embodiments.

In steps S501 and S502, the gNB first collects information about all the UEs with matured (ready) local models to transmit. The UEs with matured local models send their time (e.g. timer) information to gNB for each FL model selection round (S503, S504). Steps S501 to S504 are example signaling implementations of step S401 of FIG. 4 and of step S201 of FIG. 2 and step S301 of FIG. 3.

After completing UE model selection (S505), in S506 the gNB transmits updated timer information to the UE only if the UE is not selected for transmission of its local model in this round. If the UE is selected for transmission of its local model, it is allocated resources in S506 and it transmits its model. In this case, no explicit timer information is required and the UE resets its timer. Step S506 is an example signaling implementation of S403 of FIG. 4. In other words, according to at least some example embodiments, if the UE is selected for transmission, the UE resets its timer without explicit signaling. If the UE is not selected for transmission, the gNB explicitly signals the UE to increment its timer and use an updated value in the next round.

In the following, a UE selection process according to at least some example embodiments will be described with reference to FIG. 6.

According to at least some example embodiments, as preconditions for UE selection, the gNB knows UEs who have mature (ready) local models awaiting to be transmitted (which are referred to as first UEs in the description of FIG. 2), and time information (e.g. timer information) since the UEs have not transmitted an updated (ready) local model.

In step S601, the gNB determines an ML model collection quota (also referred to here as quota of uplink resources available for acquiring ready partial machine-learning models), which is the proportion of uplink resources to be used for ML model collection or the number of uplink RBs the gNB has after meeting the uplink data requirements of its UEs.

According to at least some example embodiments, this quota is a configured percentage, say x percent, of all RBs available in a given cell of the cellular communication system. In a lightly loaded cell, more quota (i.e. more RBs) can be reserved for ML model transmission while in a heavily loaded cell, few RBs can be made available for ML model transmission.

According to at least some example embodiments, if the quota is not configured, it is determined based on current or historical utilization of resources by the UEs.

In step S602, the gNB receives a list of UEs with mature models and the timer information about how long each UE has waited with the mature model.

In step S603, the gNB creates a priority queue ranking the UEs in order of largest_UE_timer first.

In step S604, the gNb iteratively takes the UE at top of the priority queue, the so called Head of Line (HoL) UE.

In step S605, the gNB tests if the HoL UE has a good channel, i.e. if it meets minimum channel conditions. According to an example implementation, this test is based on a predetermined threshold of channel quality (e.g., RSRP, CQI, etc.), i.e. only the UE whose channel is better than the predetermined threshold is selected as candidate for model transmission.

If the HoL UE meets the minimum channel conditions (Yes in S605), in S606 it is selected for transmitting its local model.

Otherwise (if No in S605), in S607 it is placed in a backup queue. The backup queue holds those UEs that have been waiting for long but whose channel conditions have been found to be not good enough.

Further, in S606, the selected UE is assigned RBs and the quota is updated according to the assignment.

In S608, the gNB checks the status of the quota.

If the quota is finished (Yes in S608), the selection process ends.

Otherwise, if the quota is not finished (No in S608) and there are still UEs in the priority queue (Yes in S609), the process continues with the selection of the next HoL in step S604 and comparing its channel condition with the predetermined threshold in step S605.

Alternatively, if the quota is not finished (No in S608) but there are no UEs in the priority queue (No in S609), if the backup queue is not empty (No in S610), the gNB selects the UE at the top of the backup queue in (S611, S606), updates the quota (S606) and tests again if the quota is finished (S608). When the backup queue is empty (Yes in S610), UE selection terminates regardless of quota.

It is noted that the UEs eliminated due to bad channels in step S605 are head of line (HoL) for the next round of FL model collection and will be prioritized if their channels have improved.

According to at least some example embodiments, the predetermined threshold regarding channel conditions (also referred to here as channel threshold) is used to assign weights to priority for DTH/UE model need, which is determined by a large timer value, and good channel conditions of the UEs. The tradeoff is as follows:

A large channel threshold will allow UEs with good channels to get more priority and transmit their models and omit UEs with large timers but relatively poor channels in step S605 above. This is more resource efficient but many DTHs may have updated models that have not been transmitted for long time.

A small channel threshold will allow the UEs with large timers to be prioritized as most of HoL UEs in priority queue will get channels. This will not be as resource efficient but more priority is given to UEs with large timers.

It is left to a particular implementation how to configure this threshold. For example, if a cell is heavily loaded and quota is small, a large channel threshold is configured to maximize resource efficiency. If timers of most of UEs is very large, a smaller channel threshold allow most of UEs with important updated local models to transmit and help fast convergence of the global aggregated model.

According to at least some example embodiments, a counter is provided that counts how many times a UE was considered for transmission (inserted in priority queue/considered as first UE) in previous rounds but was not selected for model transmission. When this counter crosses a specified threshold, the UE is unconditionally selected for transmitting its model by putting it HoL of the priority queue.

In heavily loaded cells, there may be no or negligible quota available for FL model transmission. In this case, according to at least some example embodiments, a minimum limit on quota is imposed such that quota=max (min_RBs, total_available_RBs−RBs_for_data).

Figure 7:
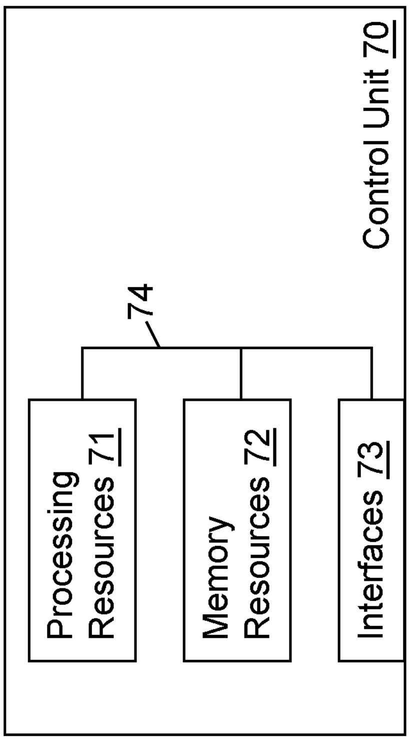
FIG. 7 shows a schematic block diagram illustrating a configuration of a control unit in which at least some example embodiments are implementable.

Now reference is made to FIG. 7 illustrating a simplified block diagram of a control unit 70 that is suitable for use in practicing at least some example embodiments. According to an example implementation, process 1 of FIG. 2 is implemented by a control unit such as the control unit 70. Further, according to an example implementation, process 2 of FIG. 3 is implemented by a control unit such as the control unit 70.

The control unit 70 comprises processing resources (e.g. processing circuitry) 71, memory resources (e.g. memory circuitry) 72 and interfaces (e.g. interface circuitry) 73, which are coupled via a wired or wireless connection 74.

According to an example implementation, the memory resources 72 are of any type suitable to the local technical environment and are implemented using any suitable data storage technology, such as semiconductor based memory devices, magnetic memory devices and systems, optical memory devices and systems, fixed memory and removable memory. The processing resources 71 are of any type suitable to the local technical environment, and include one or more of general purpose computers, special purpose computers, microprocessors, digital signal processors (DSPs) and processors based on a multi core processor architecture, as non limiting examples.

According to an implementation example, the memory resources 72 comprise one or more non-transitory computer-readable storage media which store one or more programs that when executed by the processing resources 71 cause the control unit 70 to function as network side entity or UE as described above.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

In general, example embodiments of UEs include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

According to at least some example embodiments, an apparatus for use at network side of a cellular communication system is provided. The apparatus comprises:

means for detecting first user equipments out of a plurality of user equipments of the cellular communication system,
 wherein the user equipments respectively correspond to a distributed node of a federated machine-learning concept and respectively generate a partial machine-learning model,
 wherein partial machine-learning models generated by the plurality of user equipments are to be used to update a global machine-learning model at the network side of the cellular communication system,
 wherein the first user equipments are user equipments comprising ready partial machine-learning models;

means for selecting, out of the first user equipments, second user equipments at least based on a time information associated with the first user equipments;

means for acquiring the ready partial machine-learning models respectively generated by the second user equipments;

means for updating the global machine-learning model using the ready partial machine-learning models acquired;

means for determining convergence of the global machine-learning model updated by the ready partial machine-learning models acquired; and means for, in case convergence of the global machine-learning model is not determined, repeating a process comprising the detecting, selecting, acquiring, updating and determining.

According to at least some example embodiments, the ready partial machine-learning models comprise at least one of:

partial machine-learning models that have matured;

partial machine-learning models that have matured for a predetermined first time period;

partial machine-learning models that have been updated;

partial machine-learning models that have been updated since a predetermined second time period.

According to at least some example embodiments, the time information comprises a waiting time duration for which a user equipment of the first user equipments has been waiting for transmitting its ready partial machine-learning model.

According to at least some example embodiments, the selecting comprises:

selecting the second user equipments out of the first user equipments also based on channel conditions associated with the first user equipments.

According to at least some example embodiments, the selecting comprises:

selecting the second user equipments also based on a quota of uplink resources available for acquiring ready partial machine-learning models.

According to at least some example embodiments, the selecting comprises:

prioritizing the first user equipments based on their time information.

According to at least some example embodiments, the selecting comprises:

selecting the second user equipments out of the first user equipments which have been prioritized based on their time information, based on a quota of uplink resources available for acquiring ready partial machine-learning models.

According to at least some example embodiments, the selecting further comprises:

prioritizing the first user equipments prioritized based on their time information also based on channel conditions associated with the first user equipments.

According to at least some example embodiments, the prioritizing based on channel conditions comprising:

prioritizing, for being selected as second user equipments, the first user equipments which have been prioritized based on their time information and are associated with channel conditions meeting a predetermined threshold.

According to at least some example embodiments, the selecting comprises:

selecting the second user equipments out of the first user equipments which have been prioritized based on their time information and channel conditions, based on a quota of uplink resources available for acquiring ready partial machine-learning models.

According to at least some example embodiments, the selecting comprises:

selecting a user equipment of the plurality of user equipments as second user equipment also based on a number of times of repeating the process in which the user equipment has been detected as first user equipment and has been prioritized based on the time information and has not been selected as second user equipment.

According to at least some example embodiments, the acquiring the ready partial machine-learning models respectively generated by the second user equipments comprises at least one of:

requesting the second user equipments to transmit the ready partial machine-learning model by using uplink resources available for acquiring the ready partial machine-learning models;

transmitting updated time information to first user equipments not selected as second user equipments.

According to at least some example embodiments, the detecting the first user equipments comprises at least one of:

requesting the plurality of user equipments of the cellular communication system to indicate a status of the partial machine-learning models, wherein the status indicates whether or not the partial machine-learning models are ready;

requesting the plurality of user equipments of the cellular communication system which comprise a ready partial machine-learning model to indicate the time information.

According to at least some example embodiments, the apparatus comprises at least one of:

a node of an access network of the cellular communication system;

a gNodeB;

a central unit of a gNodeB;

a machine-learning application layer;

a machine-learning host of the gNodeB.

According to at least some example embodiments, a user equipment of a plurality of user equipments for use in a cellular communication system is provided. The user equipment comprises:

means for indicating a status whether or not the user equipment, as a distributed node of a federated machine-learning concept, has a ready partial machine-learning model, and time information associated with the ready partial machine-learning model, wherein partial machine-learning models generated by the plurality of user equipments are to be used to update a global machine-learning model at a network side of the cellular communication system; and means for transmitting the ready partial machine-learning model using uplink resources available for acquiring ready partial machine-learning models upon a corresponding request from the network side.

According to at least some example embodiments, the user equipment further comprises:

means for resetting the time information after transmitting the ready partial machine-learning model; or means for updating the time information upon receiving corresponding signaling from the network side.

It is to be understood that the above description is illustrative of the and is not to be construed as limiting. Various modifications and applications may occur to those skilled in the art without departing from the true spirit and scope as defined by the appended claims.

The invention claimed is:

1. An apparatus for use at network side of a cellular communication system, the apparatus comprising:

at least one processor; and at least one memory including computer program code, the at least one memory and the computer program code configured to, with the at least one processor, cause the apparatus at least to perform:

detecting first user equipment out of a plurality of user equipment of the cellular communication system, wherein the user equipment respectively corresponds to a distributed node of a federated machine-learning concept and respectively generate a partial machine-learning model, wherein partial machine-learning models generated by the plurality of user equipment are to be used to update a global machine-learning model at the network side of the cellular communication system, wherein the first user equipment are user equipment comprising ready partial machine-learning models;

the at least one memory and computer program code being further configured, with the at least one processor, to cause the apparatus to perform:

selecting, out of the first user equipment, second user equipment at least based on a time information associated with the first user equipment;

acquiring the ready partial machine-learning models respectively generated by the second user equipment;

updating the global machine-learning model using the ready partial machine-learning models acquired;

determining convergence of the global machine-learning model updated by the ready partial machine-learning models acquired; and in case convergence of the global machine-learning model is not determined, repeating a process comprising the detecting, selecting, acquiring, updating and determining, wherein the selecting comprises:

prioritizing the first user equipment based on their time information;

prioritizing the first user equipment prioritized based on their time information also based on channel conditions associated with the first user equipment;

selecting the second user equipment out of the first user equipment which have been prioritized based on their time information and channel conditions, based on a quota of uplink resources available for acquiring ready partial machine-learning models; and selecting a user equipment of the plurality of user equipment as second user equipment also based on a number of times of repeating the process in which the user equipment has been detected as first user equipment and has been prioritized based on the time information and has not been selected as second user equipment.

2. The apparatus of claim 1, wherein the ready partial machine-learning models comprise at least one of:

partial machine-learning models that have matured;

partial machine-learning models that have matured for a predetermined first time period;

partial machine-learning models that have been updated;

partial machine-learning models that have been updated since a predetermined second time period.

3. The apparatus of claim 1, wherein the time information comprises a waiting time duration for which a user equipment of the first user equipment has been waiting for transmitting its ready partial machine-learning model.

4. The apparatus of claim 1, wherein the selecting comprises:

selecting the second user equipment out of the first user equipment also based on channel conditions associated with the first user equipment.

5. The apparatus of claim 1, wherein the selecting comprises:

selecting the second user equipment also based on a quota of uplink resources available for acquiring ready partial machine-learning models.

6. The apparatus of claim 1, wherein the selecting comprises:

selecting the second user equipment out of the first user equipment which have been prioritized based on their time information, based on a quota of uplink resources available for acquiring ready partial machine-learning models.

7. The apparatus of claim 1, the prioritizing based on channel conditions comprising:

prioritizing, for being selected as second user equipment, the first user equipment which have been prioritized based on their time information and are associated with channel conditions meeting a predetermined threshold.

8. The apparatus of claim 1, wherein the acquiring the ready partial machine-learning models respectively generated by the second user equipment comprises at least one of:

requesting the second user equipment to transmit the ready partial machine-learning model by using uplink resources available for acquiring the ready partial machine-learning models;

transmitting updated time information to first user equipment not selected as second user equipment.

9. The apparatus of claim 1, wherein the detecting the first user equipment comprises at least one of:

requesting the plurality of user equipment of the cellular communication system to indicate a status of the partial machine-learning models, wherein the status indicates whether or not the partial machine-learning models are ready;

requesting the plurality of user equipment of the cellular communication system which comprise a ready partial machine-learning model to indicate the time information.

10. The apparatus of claim 1, wherein the apparatus comprises at least one of:

a node of an access network of the cellular communication system;

a gNodeB;

a central unit of a gNodeB;

a machine-learning application layer;

a machine-learning host of the gNodeB.

* * * * *